United States Patent Office 3,483,552
Patented Dec. 9, 1969

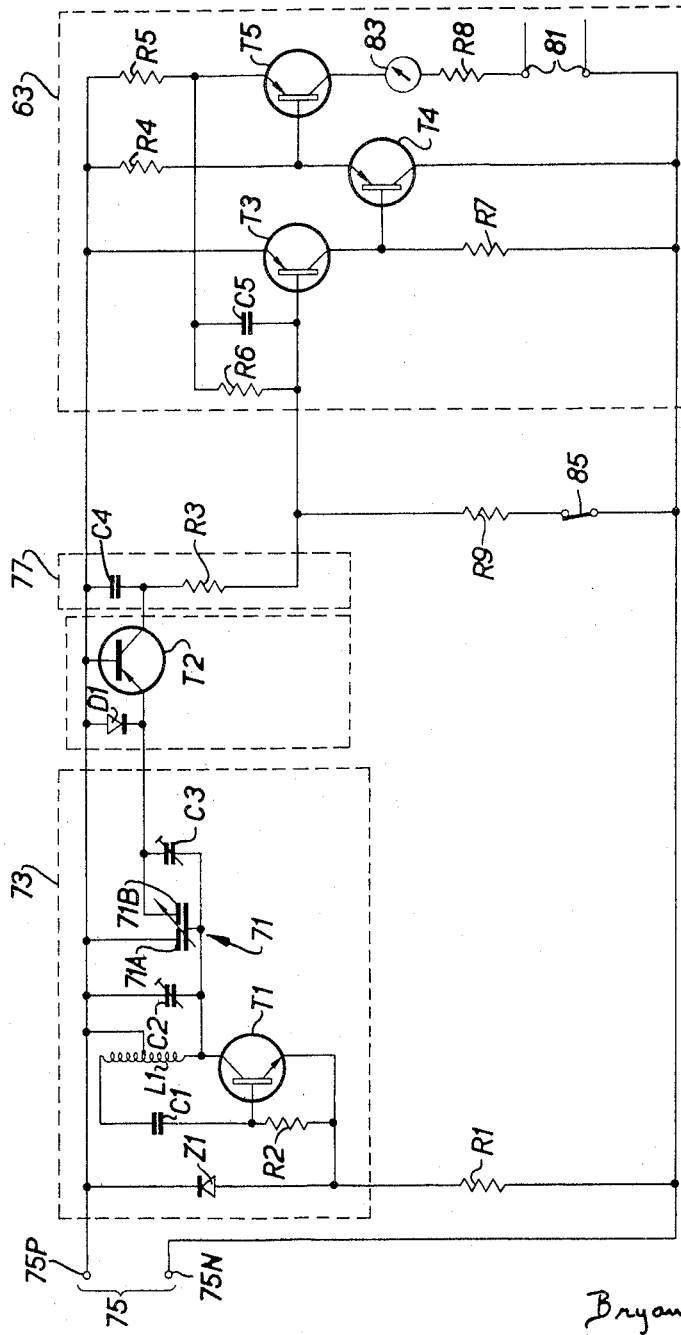

3,483,552
DIGITAL-TO-ANALOG FOR CONTROL SYSTEMS
Bryan Millar, Wilmslow, England, assignor to Associated Electrical Industries Limited, London, England, a British company
Filed Feb. 18, 1966, Ser. No. 528,426
Int. Cl. H04l 3/00; H03k 13/00
U.S. Cl. 340—347                    7 Claims

ABSTRACT OF THE DISCLOSURE

A digital-to-analog converter. A computer generates a plurality of sequential digital signals in accordance with a process program to return the process to a given condition. A stepping motor and gear train convert the signals to angularly position a differential capacitor in an oscillator circuit. The output through one capacitor section is rectified and amplified to produce a process actuator energizing signal.

BACKGROUND OF THE DISCLOSURE

This invention relates to improvements in control systems arranged for operation by digital signals.

It is common practice to utilize a digital computer to control a number of control units in the form of valve positioners and controller setpoint adjusters in a complex control system, through a multiple output distributor. Thus the digital computer provides an instruction in the form of a binary "word" containing many digits, the binary digits being applied respectively through separate leads to the multiple output distributor. This distributor contains many sets or groups of relays. Some of these digits determine the set of relays to be selected, and the remaining digits determine the states to which the selected relays are set. Latching relays may be used, so that in the intervals between the times when the computer produces fresh setting instructions for the relays of any group, those relays will remain in the state to which they were last set. The intelligence represented by the states of these relays must be applied to the appropriate valve positioners or other control units, and this is effected through an output coupler which includes the necessary transducer and determines the output from the transducer in accordance with the states of these relays.

An object of the present invention is the provision of an output coupler suitable for a control system which is operated by digital signals.

SUMMARY

According to one aspect of the present invention, an output coupler for a control system operated by digital signals includes a set of relays arranged to be actuated by the digital signals, a stepping electrical motor arranged to be stepped as appropriate by the resetting of these relays, and a transducer driven through gearing by the electrical motor, whereby the transducer provides an analogue output controlled by the digital signals. Preferably the equipment includes a set of latching relays arranged to be actuated by the digital signals, a stepping electrical motor arranged to be stepped as required by appropriate sequential adjustment of these relays and a transducer driven through gearing by the electrical motor and the arrangement is such that the transducer provides an analogue output of a value determined by the sequence of digital signals.

DESCRIPTION OF THE DRAWINGS

The invention will now be described, by way of example, with reference to the accompanying drawings, in which:

FIGURE 2 is a circuit diagram of a transducer and an associated amplifier circuit indicated diagrammatically in FIGURE 1.

DESCRIPTION OF AN ILLUSTRATIVE EMBODIMENT

Figure 1:
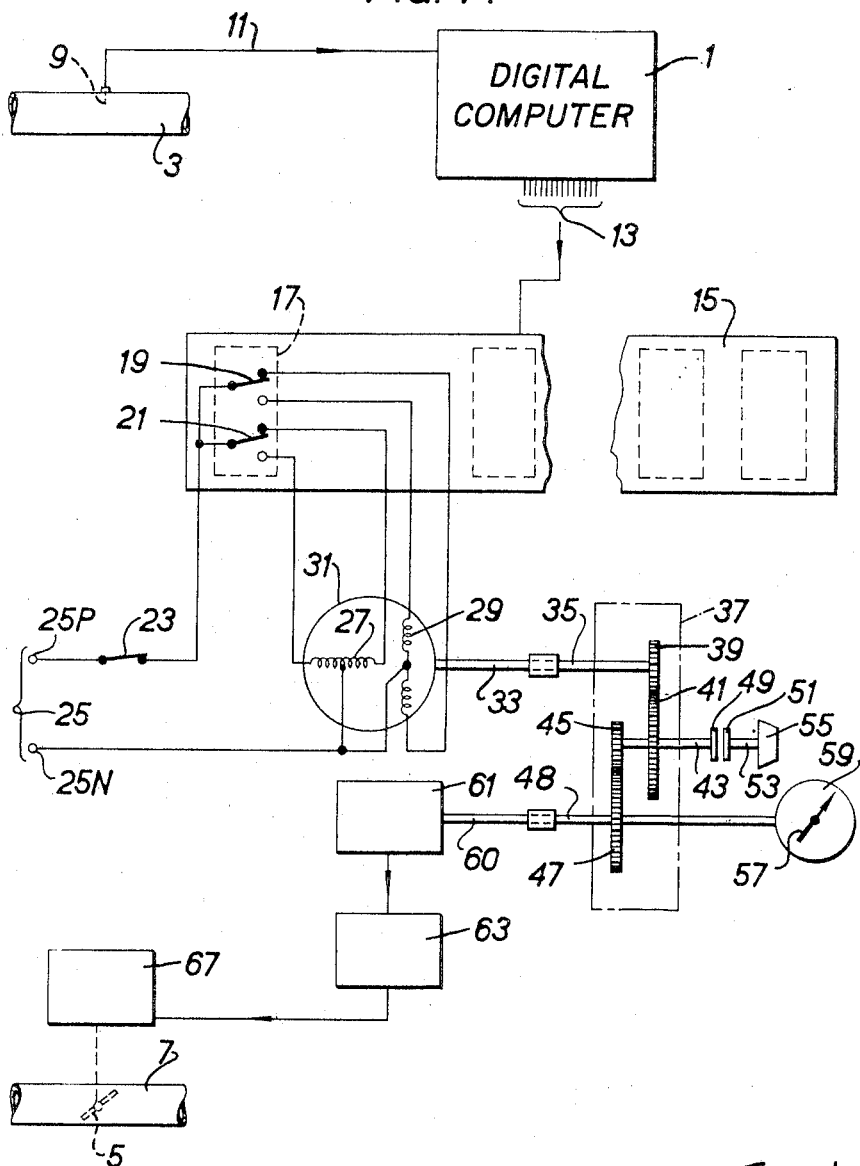
FIGURE 1 is a diagrammatic representation of a control system including a digital computer and a valve positioner actuated indirectly by that computer.

Referring first to FIGURE 1, merely by way of example a digital computer 1 is shown in an arrangement in which, among other control functions, it is required to control the temperature of liquid in a conduit 3 by regulating the setting of a valve 5 in a second conduit 7, the arrangement being such that variation of the setting of the valve varies the temperature of the liquid in conduit 3. A temperature sensitive device 9 is arranged to sense the temperature of the liquid in conduit 3, and a signal indicative of this temperature is generated thereby and applied through a lead 11 to the computer 1, which is programmed to compare this measured value with a set value, to determine the error in the measured value from the set value, to decide a suitable variation in the setting of the valve 5 to correct the error, and to cause resetting of the valve 5. The suitable variation is in the form of a function of the error signal, and includes a proportional term, an integral term and a differential term, although at any one time one or more of these terms may equal zero.

The output from the digital computer appears as a binary "word" in a set of leads 13 and is applied to a multiple output distributor 15 consisting of groups of relays such as the group 17 and of selecting means by which certain digits in the binary "word" are caused to select the appropriate relays and the remaining digits are caused to set those relays in accordance with the magnitudes of the digits. Computers for performing this function are known in the art. Circuits in either the computer 1 or the multiple output distributor 15 would convert the binary word to a sequence of digital signals in this specifically described embodiment.

The group of relays 17 consists of a first self-latching two-way relay 19 and a second self-latching two-way relay 21. The movable member of each relay is connected through a normally closed switch 23 to one pole 25P of a direct current supply 25. The second pole 25N of that supply is connected to the centre points 27C and 29C respectively of the two quadrature windings 27 and 29 of a stepping motor 31. The two ends of winding 27 are connected respectively to the two output termnials of the relay 21 and the two ends of windings 29 are connected respectively to the two output terminals of the relay 19. The stepping motor includes a permanent magnet rotor which will assume an angular orientation depending upon the ambient magnetic field produced by the energisation of parts of the windings 27 and 29. It will be seen that at all times one half of each winding is energised, so that there are four possible states of energisation; if the motor is of the two pole type, there will therefore be four possible positions of the rotor when the windings are energised. Thus the motor can be made to drive through a number of successive steps (of 90° for a 2-pole machine) by means of a sequence of computer signals along leads 13 which cause relays 19 and 21 to change their settings alternately. The motor may be driven in the opposite direction by a similar but reversed sequence of relay operations.

The rotor of the motor 31 is connected through a shaft 33 to the input shaft 35 of a gear box 37, which carries a spur gear wheel 39 engaging a larger spur gear wheel 41 mounted on a shaft 43. Also mounted on shaft 43 is a smaller gear wheel 45 arranged to engage a larger gear wheel 47 mounted on an output shaft 48 of the gear box. The shaft 43 carries a clutch member 49 which is normally free of a second clutch member 51 mounted on a shaft 53 carried by the gear box and provided with a manual control knob 55. The knob 55 can be moved manually inwardly to clutch member 51 to member 49 and can then be turned to reset output shaft 48, as long as the motor 31 is not energised and can thus have its rotor turned freely. Output shaft 48 carries a pointer 57 coacting with a calibrated dial 59, and at the other end is connected to the rotor 60 of an angle-to-electrical transducer 61. This transducer 61 in indicated only diagrammatically in FIGURE 1, and FIGURE 2 shows the circuit diagram of the transducer and an associated amplifier 63. The output from the amplifier appears as an energizing current signal which is applied to a process controlling actuator such as a valve positioner 67 having an output shaft mechanically coupled to the valve 5.

Referring now to the circuit of FIGURE 2, the transducer 61 is in the form of a differential capacitor 71 having two sets of fixed upper vanes 71A and 71B and one set of movable lower vanes, the arrangement being such that at all times the sum of the two capacitances respectively between the movable vanes and the two sets of fixed vanes is substantially constant, while the ratio of these two capacitances depends upon the position of the moving vanes. The movable vanes are mounted on rotor 60 so the multiple output distributor 15, the stepping motor 31, the gear box 37 and the output shaft 48 constitute a means responsive to the digital signals for incrementally varying the capacitor 71. Capacitor 71 is the main capacitor in an oscillator circuit 73 including an n-p-n transistor T1 the emitter of which is connected through a resistor R1 to the negative pole 75N of a stable 35 volts direct current supply 75, and the base of which is connected firstly through a resistor R2 to its emitter and secondly through a capacitor C1 and an inductance L1 to its collector. The emitter is also connected to the positive pole 75 P of the supply 75 through a reversely arranged diode serving as a Zener diode Z1. The centre point on the inductance L1 is also connected to the pole 75P. The movable lower vanes of the capacitor 71 are connected to the collector of transistor T1, the fixed upper vanes 71A are connected to the pole 75P, and the fixed upper vanes 71B are connected to the emmiter of a p-n-p transistor T2. The capacitor formed by the moving vanes and the fixed vanes 71A is shunted by a trimmer capacitor C2, and the capacitor formed by the moving vanes and the fixed vanes 71B is shunted by a trimmer capacitor C3. The base of transistor T2 is connected to the positive pole 75P, which is also connected in the forward direction by a diode D1 to the emitter of this transistor. The oscillator circuit 73 is arranged to oscillate at a frequency of 0.5 M c.p.s. and to provide a 10 volts peak output between its collector electrode and the pole 75P. This frequency and output remains substantially constant despite variations in the angular setting of the rotor 60 carrying the movable vanes of capacitor 71. The capacitance difference between the two capacitors including respectively the vanes 71A and 71B has a swing of 200 pf. as the rotor is moved from one of its limiting positions to its alternative limiting position. The distribution between the vanes 71A and 71B of the current flowing through capacitor 71 will depend upon the setting of the movable vanes, and the current through the vanes 71B flows during alternate half cycles through the emitter-base circuit of transistor T2 and during the remaining half cycles through the diode D1, the transistor T2 and diode D1 merely constituting a full wave rectifier means. The current in the collector/base circuit of this transistor is thus interrupted direct current, the value of which depends upon the position of the movable vanes of capacitor 71.

The collector of transistor T2 is connected firstly through a capacitor C4 of 0.005 µf. to the pole 75P and secondly through a resistor R3 of 33 ohms to the base of a p-n-p transistor T3. Capacitor C4 and resistor R3 together form a filter circuit 77 which is effective to smooth to a considerable extent the direct current applied to the base of transistor T3. This current lies in the range 0.5 to 2.5 ma. as the rotor of the transducer 61 is swung over its working range of movement. Transistor T3, with two further p-n-p transistors T4 and T5, forms the amplifier 63 having output terminals 81. The emitter of transistor T3 is connected directly to pole 75P. The emitter of transistor T4 is connected to pole 75P through a resistor R4 of 22,000 ohms. The emitter of transistor T5 is connected to the pole 75P through a resistor R5 having a resistance selected so that a voltage change of 5 volts across it shall produce a current swing in the transistor output matching the full current swing required by the valve positioner 67. The emitter of transistor T5 is also connected through the parallel combination of a capacitor C5 of 1 µf. and a resistor R6 of 2,500 ohms, to the base of transistor T3. The collector of transistor T3 is connected to the base of transistor T4 and, through a resistor R7 of 100,000 ohms, to the negative pole 75N. The emitter of transistor T4 is connecter to the base of transistor T5, and its collector is connected directly to the pole 75N. The collector of transistor T5 is connected through a milliammeter 83 and a series resistor R8 to one of the output terminals 81, the other of which is connected to the pole 75N. A resistor R9 of 68,000 ohms is connected between pole 75N and the base of transistor T3, but can be disconnected by opening of a series connected switch 85.

In use of the apparatus described above, the setting of the rotor 60 of the transducer 61 determines the part of the tuned circuit circulating current which passes through the transistor T2, and thus the current flowing through resistor R3. The amplifier 63 has a "virtual earth" input and a high impedance output. For "true zero" output, a fixed current bias is applied to the amplifier input through the resistor R9, the switch 85 being closed. When the switch 85 is opened the amplifier operates with an "offset zero" output.

The output coupler described above is relatively economic in amount of equipment it involves, and yet it is effective to "freeze" the setting of the control unit to which it applies an input, should the digital computer for any reason become inoperative. This is important, since in the case of a failure of the computer, it enables the apparatus controlled by the control system to continue to function, even although the efficiency may be reduced.

The particular type of transducer described, utilizing a differential capacitor controlling the output from an oscillatory circuit, has a long life since it includes no rubbing or wiping contacts.

The invention is not limited to control systems in which the transducer is a differential capacitor, and the transducer can be a mechanical/pneumatic device producing a variaple output air pressure. Alternatively, the transducer can include a differential transformer or one or more potentiometers.

What I claim is:

1. In a system including a process condition signal generator, a process controlling actuator responsive to an energizing current signal and a computer responsive to the process condition signal for generating a series of sequential digital signals and an output thereof to return the process condition to a predetermined value, the improvement of means for converting the digital signals to the energizing current signal, said conversion means comprising:

(a) a constant frequency oscillator including first and second coacting, differentially variable frequency-determining means, (b) means responsive to the digital signals for incrementally varying said frequency-determining means, and (c) amplifier means in series with said second frequency-determining means to be energized by the current therethrough, said amplifier means output being the energizing current signal whereby the process controlling actuator is varied to return the process condition to the predetermined position.

2. In a system as recited in claim 1, said constant frequency oscillator frequency-determnining means comprising a differential capacitor having first and second parallel sections each including movable vane portions, said total capacitance being substantially constant and the capacitive ratio of said sections being responsive to the position of said movable vanes, said digital signal responsive means including means for positioning said movable vanes.

3. In a system as recited in claim 2, said amplifier means comprising a full wave rectifier means in series with said second capacitor section and a D-C amplifier connected to said rectifier means to be energized during one half cycle of output from said oscillator.

4. In a system as recited in claim 3, said digital signal responsive means including electro-mechanical means for converting the digital signals to movable vane position, said electro-mechanical means including override means for permitting manual operation of the actuator.

5. In a system as recited in claim 3, the digital signal responsive means including a stepping motor, a plurality of relays sequentially energized by the digital signals to rotate the stepping motor rotor through discrete angular displacements and gearing means connecting said stepping motor to said movable vanes.

6. In a system as recited in claim 5, said full wave rectifier comprising a transistor and a diode connected between the base and emitter thereof to be energized by said oscillator through said second capacitor section, the base and collector being adapted for energization by a power supply, the collector being coupled to said D-C amplifier.

7. In a system as recited in claim 6, said gearing means additionally including overriding clutch means for permitting manual position of said movable means when said stepping motor is de-energized.

References Cited

UNITED STATES PATENTS

| | | | |
|---|---|---|---|
| 2,571,746 | 10/1951 | Monzon | 318—20.740 |
| 2,640,954 | 6/1953 | Sherwin | 318—20.821 |
| 2,641,931 | 6/1953 | Wild | 318—20.740 |
| 2,972,106 | 2/1961 | Hyrne | 318—20.740 |
| 3,039,030 | 6/1962 | Weidner | 340—347 |
| 3,219,895 | 11/1965 | Price | 340—347 |
| 3,315,250 | 4/1967 | Higgins | 340—347 |

MAYNARD R. WILBUR, Primary Examiner

JEREMIAH GLASSMAN, Assistant Examiner

U.S. Cl. X.R.

235—151.1